United States Patent
Sooriakumar et al.

[11] Patent Number: 5,888,412
[45] Date of Patent: Mar. 30, 1999

[54] METHOD FOR MAKING A SCULPTURED DIAPHRAGM

[75] Inventors: Kathirgamasundaram Sooriakumar; Andrew C. McNeil, both of Scottsdale; Kenneth G. Goldman, Chandler; Mahesh K. Shah, Scottsdale, all of Ariz.

[73] Assignee: Motorola, Inc., Schaumburg, Ill.

[21] Appl. No.: 610,033

[22] Filed: Mar. 4, 1996

[51] Int. Cl.[6] ............................................. B44C 1/22
[52] U.S. Cl. .................. 216/41; 216/2; 438/759; 430/319; 430/320
[58] Field of Search .................. 216/2, 41; 437/228; 430/313, 316, 319, 320, 323; 438/759

[56] References Cited

U.S. PATENT DOCUMENTS

| | | | |
|---|---|---|---|
| 4,133,100 | 1/1979 | Myhre | 29/610 SG |
| 4,599,792 | 7/1986 | Cade et al. | 29/576 W |
| 4,994,141 | 2/1991 | Harms et al. | 156/643 |
| 5,095,401 | 3/1992 | Zavracky et al. | 361/283 |
| 5,354,695 | 10/1994 | Leedy | 437/7 |
| 5,421,956 | 6/1995 | Koga et al. | 216/2 |
| 5,445,991 | 8/1995 | Lee | 216/2 |
| 5,500,078 | 3/1996 | Lee | 156/628.1 |
| 5,549,785 | 8/1996 | Sakai et al. | 156/644.1 |
| 5,585,311 | 12/1996 | Ko | 437/228 |
| 5,595,930 | 1/1997 | Baek | 437/53 |
| 5,616,514 | 4/1997 | Muchow et al. | 438/50 |
| 5,632,854 | 5/1997 | Mirza et al. | 438/53 |

*Primary Examiner*—Nam Nguyen
*Assistant Examiner*—Steven H. Ver Steeg
*Attorney, Agent, or Firm*—Robert F. Hightower; Miriam Jackson

[57] ABSTRACT

A sculptured diaphragm of a sensor is fabricated by providing a semiconductor material, forming at least one cavity on the front side of the semiconductor material, forming a diaphragm layer over the semiconductor material, and the etching a cavity on the back side of the semiconductor material. If a sensor having a diaphragm with a central boss is desired, then the diaphragm layer is planarized to form a thick and a thin portion in the diaphragm layer.

15 Claims, 2 Drawing Sheets

METHOD FOR MAKING A SCULPTURED DIAPHRAGM

BACKGROUND OF THE INVENTION

The present invention relates in general to semiconductor devices and, more particularly, a method of forming a sculptured diaphragm.

Semiconductor sensors are comprised of thin diaphragm formed on a semiconductor substrate. The diaphragm is typically formed by etching the back side of a semiconductor substrate to form a cavity and leaving a thin layer of semiconductor material to act as the diaphragm.

The deformation or movement of the diaphragm causes a change in capacitance or resistance. In order to respond to low pressures, the diaphragm thickness is reduced. However, a thin diaphragm causes more nonlinearities to occur in the output due to the presence of nonlinear membrane stresses present on the surface of the diaphragm.

To reduce the nonlinearity, a diaphragm of variable thickness is desirable. Such diaphragms have been fabricated by making certain portions of the diaphragm thicker than others. The thicker portions of the diaphragm are called bosses. This approach allows the fabrication of high output, low pressure sensors with substantially linear outputs.

It would therefore be advantageous to be able to fabricate a sensor with a diaphragm having a thick central boss in a cost competitive manner.

DETAILED DESCRIPTION OF THE DRAWINGS

Figure 1:
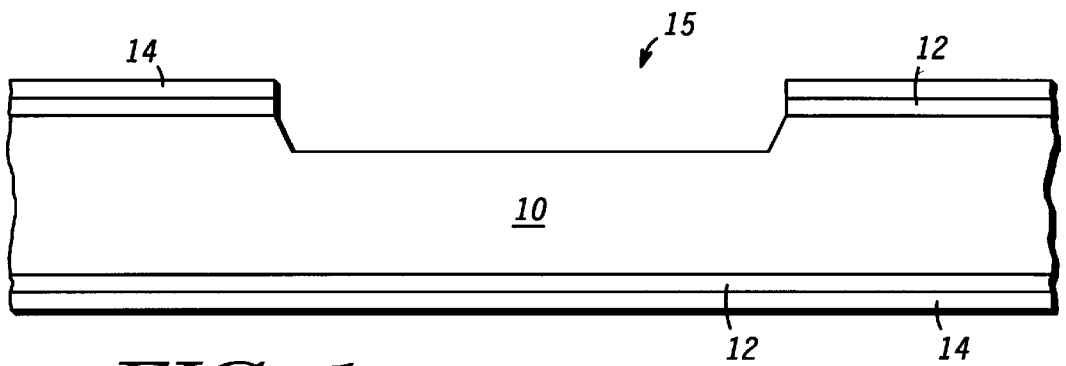
FIG. 1 illustrates a cross-sectional view of an embodiment of the present invention in a beginning stage of fabrication.

A first embodiment of the present invention is described in conjunction with FIGS. 1–4. A method of forming a sculptured diaphragm is described. A starting semiconductor material 10, which can be comprised of a silicon wafer substrate, is provided. Semiconductor material 10 can be comprised of either p-type or n-type conductivity. Conductivity of semiconductor material 10 will be dependent on the application or circuit requirements of the sensor. A cavity 15 is formed in semiconductor material 10, extending from the first major surface of semiconductor material 10. FIG. 1 illustrates one way of forming cavity 15. Insulating layers 12 are formed over the first major surface and the second major surface of semiconductor material 10. Insulating layers 12 are preferably comprised of silicon dioxide and can be formed by thermal oxidation or deposition. Over these insulating layers 12 a protective layer 14 is formed to function as a masking layer. Protective layers 14 are preferably comprised of a material that can withstand the chemicals used later in the processing. Silicon nitride is one such suitable material which can comprise protective layers 14. Silicon nitride can be formed by using a low pressure chemical vapor deposition (LPCVD) process. It is possible to carry out the present invention without the use of insulating layers 12, but insulating layers 12 are useful for further protection of the surface of semiconductor material 10 during etching and polishing.

Still with reference to FIG. 1, protective layer 14 and insulating layer 12 over the first major surface of semiconductor material 10 are then patterned using, for example, standard photolithography and etch techniques. In this embodiment, a single opening (for each of a plurality of sensor devices typically formed on a one semiconductor wafer) is provided to expose a portion of the first major surface of semiconductor material 10.

The exposed portion of semiconductor material 10 at the first major surface is removed to form a cavity 15. In a preferred embodiment, the depth of cavity 15 is approximately 1 to 50 microns. The etch can be performed by using wet etchants such as potassium hydroxide (KOH), tetramethyl ammonium hydroxide (TMAH), ethylenediamine pyrocatechol (EDP), or dry etchants such as an SF6/Cl2 based plasma etch. Other suitable etchants of what semiconductor material 10 is comprised of can be used. Thereafter, protective layer 14 and insulating layer 12 are removed from the first major surface of semiconductor material 10. A dry etch is performed so that only the layers 12 and 14 are removed from the first major surface and not the second major surface. Alternatively, a wet etch may be used, with layers 12 and 14 also being removed (not shown) from the second major surface. A wet etch is preferred because it is more selective to semiconductor material 10 and it allows for batch processing.

Figure 2:
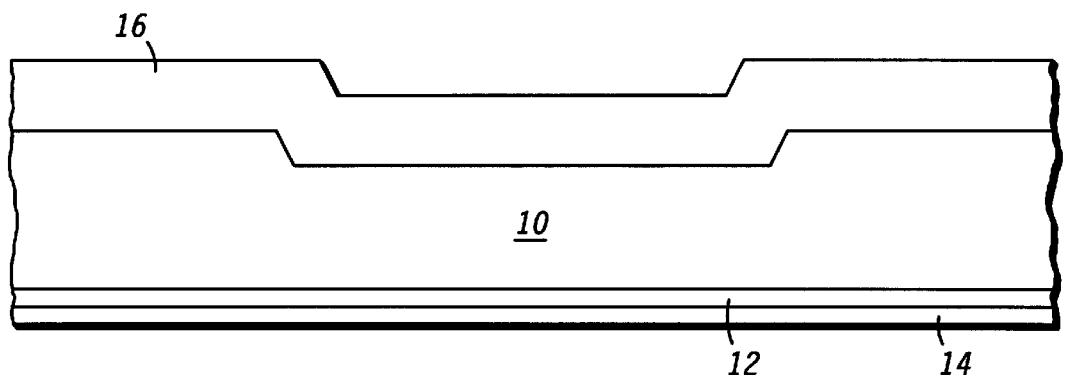
FIG. 2 illustrates a cross-sectional view of the embodiment of FIG. 1 in a later stage of fabrication.

FIG. 2 illustrates the structure of FIG. 1 further along in processing. A deformable member or diaphragm layer 16 is formed over the first major surface of semiconductor material 10 and extending into cavity 15 to contact the surfaces thereof. Diaphragm layer can be either p-type or n-type. In one embodiment, diaphragm layer 16 is comprised of an epitaxial semiconductor layer grown on the first major surface of semiconductor material 10 wherein substrate 10 is a first conductivity type and layer 16 is a second conductivity type. In another embodiment, diaphragm layer 16 is comprised of polysilicon, which can be deposited over the first major surface of semiconductor material 10. The thickness of diaphragm layer 16 is determined by the desired thickness of the central boss portion (shown in FIG. 4). In this embodiment, diaphragm layer 16 should have a thickness greater than the depth of cavity 15. Typically, diaphragm layer 16 will be approximately 2 to 60 microns thick.

Figure 3:
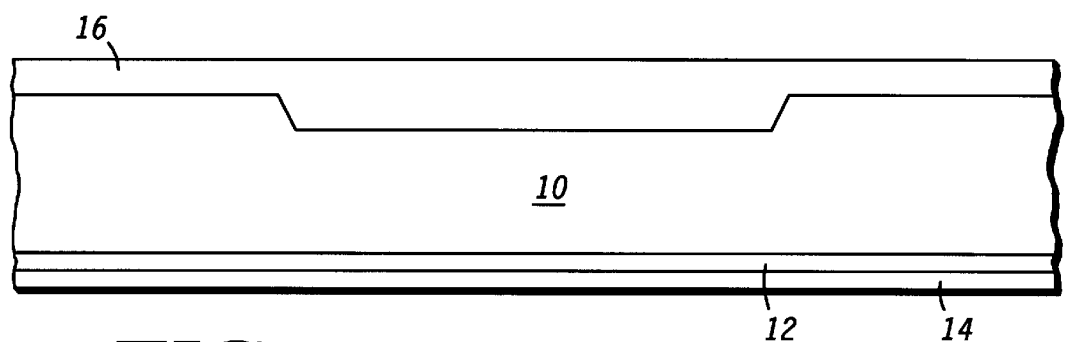
FIG. 3 illustrates a cross-sectional view of the embodiment of FIG. 2 in a later stage of fabrication.

FIG. 3 illustrates the structure of FIG. 2 further along in processing. Diaphragm layer 16 is substantially planarized. The planarization can be performed by chemical-mechanical polishing or other suitable means. Insulating layer 12 and protective layer 14 on the second major surface of semiconductor material 10 can serve to protect the second major surface of semiconductor material 10 from the chemicals used to planarize diaphragm layer 16. Alternatively, the second major surface of semiconductor material 10 can be protected by other means.

Figure 4:
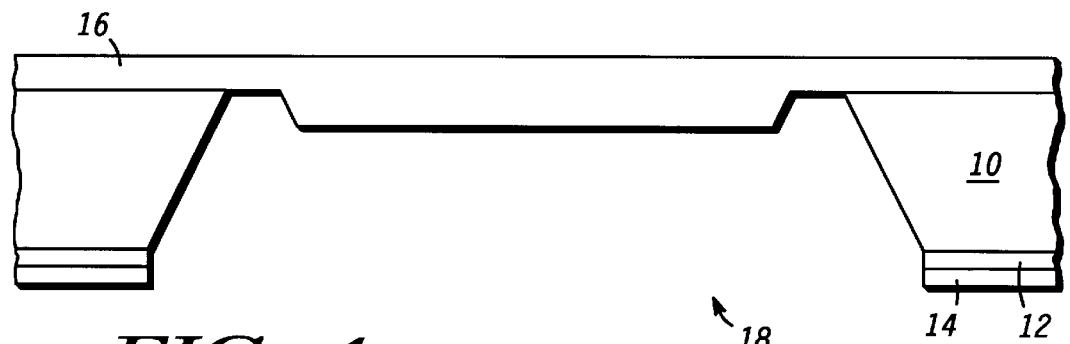
FIG. 4 illustrates a cross-sectional view of the embodiment of FIG. 3 in a later stage of fabrication.

FIG. 4 illustrates the structure of FIG. 3 further along in processing. A cavity 18 is formed in semiconductor material 10, extending from the second major surface of semiconductor material 10 to diaphragm layer 16. FIG. 4 illustrates one way to form cavity 18. A portion of protective layer 14 and insulating layer 12 are removed and utilized as a mask. Various wet or dry etches can be used to pattern these layers, as has been disclosed above. If protective layer 14 and insulating layer 12 had been removed earlier, then a new masking layer would be formed and patterned on the second major surface of semiconductor material 10.

After protective layer 14 and insulating layer 12 have been etched down to silicon substrate 10, these layers are used as a mask to etch a portion of semiconductor material 10. Preferably, a KOH, TMAH or EDP etch is used to remove the exposed portion of semiconductor material 10. The first major surface must be protected during the formation of cavity 18. For example, a protective layer may be formed over diaphragm layer 16 or appropriate fixtures must be used to prevent the etchants used to form cavity 18 from etching diaphragm layer 16 from the side opposite the side cavity 18 is formed.

A completed sensor has circuitry formed on diaphragm layer 16, the formation of which will not be described herein. As can be seen in FIG. 4, diaphragm layer 16 is comprised of a thick boss region comprising at least the portion of layer 16 that was contacting the surface of cavity 15 so that the boss has a surface in a first plane and a portion surrounding the boss which is thinner comprising a portion of layer 16 that was not over cavity 15 so that the thinner area has as surface in a second plane. Diaphragm layer 16 having variable thickness reduces the nonlinearities in the sensor device without reducing the sensitivity. Preferably, the boss portion should be positioned at the substantially in the center of diaphragm layer 16 when the circuitry formed in diaphragm layer 16 requires symmetry.

Figure 5:
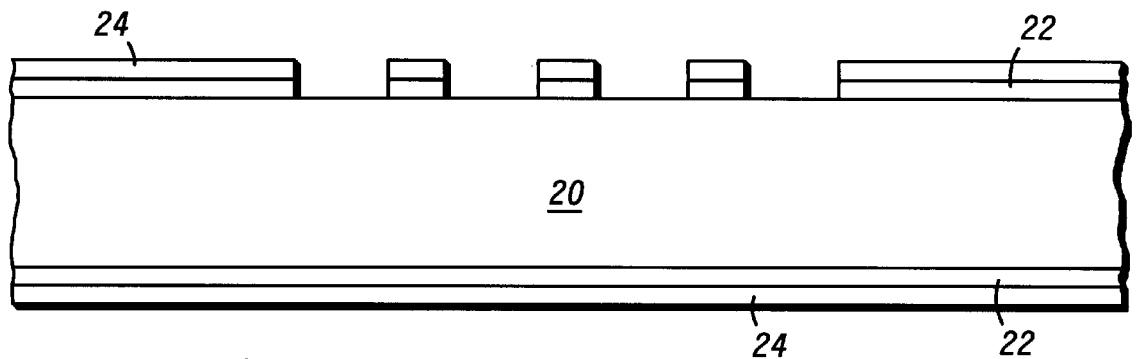
FIG. 5 illustrates a cross-sectional view of a second embodiment of the present invention in a beginning stage of fabrication.

FIG. 5 illustrates a second embodiment of the present invention. The second embodiment is similar to the first embodiment shown in FIGS. 1–4, and thus the second embodiment will be discussed more briefly. A starting semiconductor material 20 is provided. Insulating layers 22 are formed over the first major surface and the second major surface of semiconductor material 20. Insulating layers 22 are comprised of the same material as insulating layers 12. Over these insulating layers 22 a protective layer 24 is formed. Protective layers 24 are comprised of the same material as protective layers 14.

Still with reference to FIG. 5, protective layer 24 and insulating layer 22 over the first major surface of semiconductor material 20 is then patterned using, for example, standard photolithography and etch techniques. In this embodiment, a plurality of openings 25 are provided to expose a plurality of portions of the first major surface of semiconductor material 20.

Figure 6:
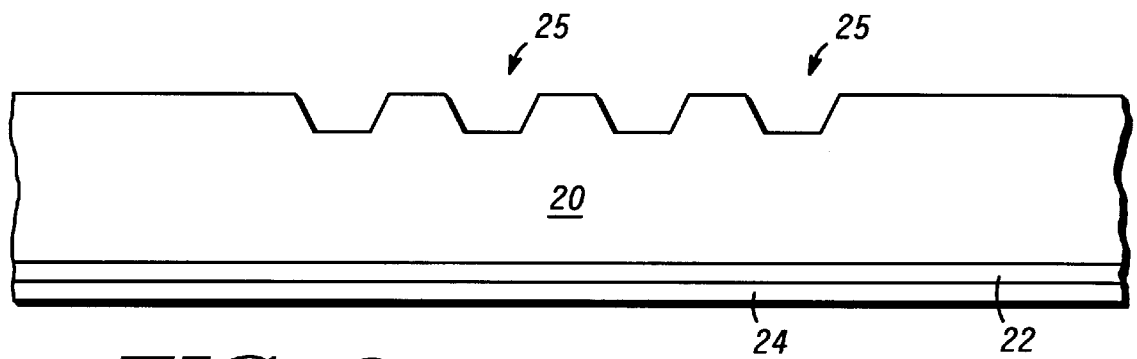
FIG. 6 illustrates a cross-sectional view of the embodiment of FIG. 5 in a later stage of fabrication.

FIG. 6 illustrates the structure of FIG. 5 further along in processing. The exposed portion of semiconductor material 20 at the first major surface is removed to form a plurality of cavities 25. In a preferred embodiment, the depth of the plurality of cavities 25 are approximately 2 to 25 microns. The etch can be performed as described above with reference to FIG. 1. Thereafter, protective layer 24 and insulating layer 22 are removed from the first major surface of semiconductor material 20.

Figure 7:
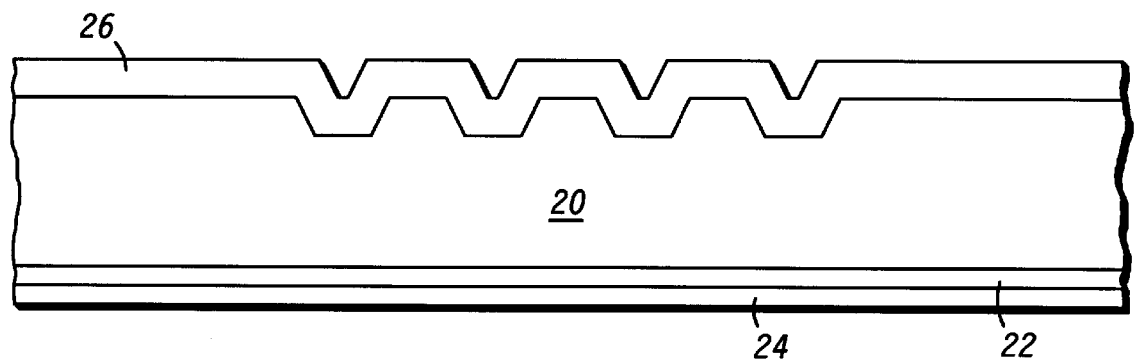
FIG. 7 illustrates a cross-sectional view of the embodiment of FIG. 6 in a later stage of fabrication.

FIG. 7 illustrates the structure of FIG. 6 further along in the process. A diaphragm layer 26 is formed over the first major surface of semiconductor material 20. Diaphragm layer 26 may be comprised of an epitaxial layer or a polysilicon layer. Typically, diaphragm layer 26 in this embodiment will be approximately 2 to 50 microns thick. In this embodiment, it is not necessary to planarize the surface of diaphragm layer 26.

Figure 8:
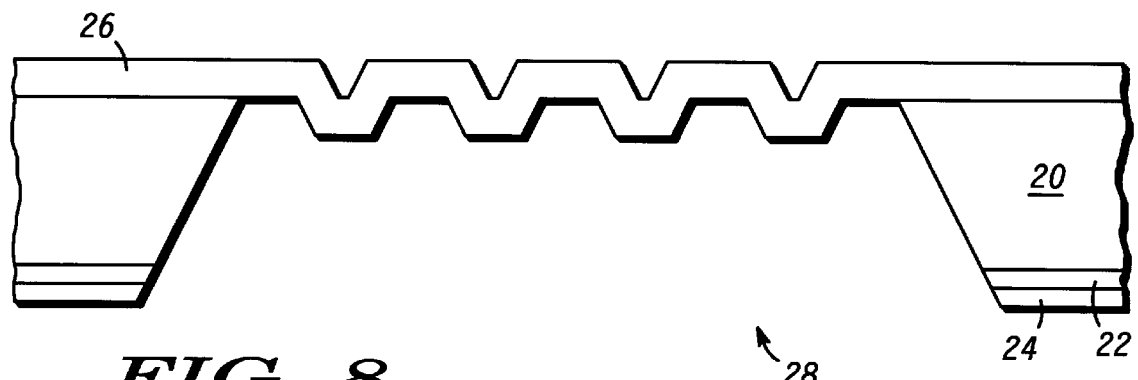
FIG. 8 illustrates a cross-sectional view of the embodiment of FIG. 7 in a later stage of fabrication.

FIG. 8 illustrates the structure of FIG. 7 further along in processing. A cavity 28 is formed in semiconductor material 20, extending from the second major surface of semiconductor material 20 to diaphragm layer 26.

In this embodiment, diaphragm layer 26 is formed having corrugations. This embodiment is suitable for the formation of a corrugated diaphragm for a low pressure sensor, as well as a capacitive sensor. Also, if the plurality of cavities 25 are spaced apart enough, a sensor having multiple bosses instead of corrugations can be formed. The corrugations of diaphragm 26 may be of any shape or configuration which provides the desired stress relief, sensitivity, linearity, and frequency response. In addition, the corrugation may or may not extend over the entire surface of diaphragm 26.

As can be seen, a method for forming a sculptured diaphragm of a sensor has been provided. The resultant diaphragm is sculptured to have a thin portion and a thick portion (a boss) or corrugations. The method of this invention enables the formation of a diaphragm with a boss or corrugations of varying thicknesses and geometries. Advantages of structures can be provided by forming at least one cavity on one surface of a substrate, forming a semiconductor layer contacting surfaces of the at least one cavity, and forming another cavity by removing a portion of the substrate extending from a second major surface to the semiconductor layer to form a diaphragm comprising at least the semiconductor layer contacting surfaces of the at least one cavity being exposed by the another cavity and in a first plane, and comprising a portion of the semiconductor layer not over the at least one cavity being exposed by the another cavity and in a second plane.

Such advantages can also be provided by providing a semiconductor material having a first major surface and a second major surface; forming a masking layer over the first major surface and the second major surface of the semiconductor material; removing a portion of the masking layer to expose a portion of the first major surface of the semiconductor material; forming at least one cavity in the semiconductor material extending from the first major surface into the semiconductor material; removing the masking layer; forming a semiconductor layer over the first major surface of the semiconductor material and over the at least one cavity; and forming another cavity by removing a portion of the semiconductor material extending from the second major surface to the semiconductor layer for forming a deformable member comprising at least a portion of the semiconductor layer not over the at least one cavity being exposed by the another cavity.

The advantages can also be provided by providing a semiconductor material having a first major surface and a second major surface; forming at least one cavity extending from the first major surface into a portion of the semiconductor material; forming a diaphragm layer over the first major surface of the semiconductor material and over the at least one cavity; substantially planarizing the diaphragm layer so that a thick portion and a thin portion is formed in the diaphragm layer; and removing a portion of the semiconductor material extending from the second major surface to the diaphragm layer to provide at least a portion of the thick portion of the diaphragm layer formed over the at least one cavity. In the present invention, a low amount of stress is placed on the diaphragm during manufacture because the diaphragm is not micromachined to sculpt the boss after the formation of the cavity on the backside of the sensor, as is done in the prior art.

We claim:

1. A method of forming a diaphragm, comprising the steps of:

providing a semiconductor material having a first major surface and a second major surface;

forming at least one cavity extending from the first major surface into the semiconductor material;

forming a semiconductor layer over the first major surface of the semiconductor material and extending into the at least one cavity to contact surfaces of the at least one cavity; and forming another cavity by removing a portion of the semiconductor material extending from the second major surface to the semiconductor layer to form a diaphragm comprising at least the semiconductor layer contacting surfaces of the at least one cavity being exposed by the another cavity and in a first plane, and comprising a portion of the semiconductor layer not over the at least one cavity being exposed by the another cavity and in a second plane.

2. The method of claim 1 further comprising the step of:

substantially planarizing the semiconductor layer.

3. The method of claim 1 wherein the step of forming the semiconductor layer comprises forming an epitaxial semiconductor layer.

4. The method of claim 1 wherein the step of forming the semiconductor layer comprises forming a polysilicon layer.

5. The method of claim 1 wherein the step of forming the at least one cavity comprises forming the at least one cavity to a depth of approximately 1 to 50 microns.

6. The method of claim 1 wherein the step of providing the semiconductor material comprises providing the semiconductor material having a first conductivity type and the step of forming the semiconductor layer comprises forming the semiconductor layer having a second conductivity type.

7. The method of claim 1 wherein the step of forming the semiconductor layer comprises forming the semiconductor layer having a thickness of approximately 2 to 60 microns.

8. A method of forming a diaphragm comprising the steps of:

providing a semiconductor material having a first major surface and a second major surface;

forming more than one cavity extending from the first major surface into the semiconductor material;

forming a semiconductor layer over the first major surface of the semiconductor material and contacting surfaces of the at least one cavity; and removing a portion of the semiconductor material extending from the second major surface to the semiconductor layer to form a diaphragm having corrugations therein and comprising at least the semiconductor layer contacting surfaces of the at least one cavity and in a first plane, and comprising a portion of the semiconductor layer not over the at least one cavity and in a second plane.

9. A method of forming a deformable member, comprising the steps of:

providing a semiconductor material having a first major surface and a second major surface;

forming a masking layer over the first major surface and the second major surface of the semiconductor material;

removing a portion of the masking layer to expose a portion of the first major surface of the semiconductor material;

forming at least one cavity in the semiconductor material extending from the first major surface into the semiconductor material;

removing the masking layer;

forming a semiconductor layer over the first major surface of the semiconductor material and over the at least one cavity; and forming another cavity by removing a portion of the semiconductor material extending from the second major surface to the semiconductor layer for forming a deformable member comprising at least a portion of the semiconductor layer not over the at least one cavity being exposed by the another cavity.

10. The method of claim 9 further comprising the step of:

substantially planarizing the semiconductor layer.

11. The method of claim 9 wherein the step of forming the semiconductor layer comprises forming an epitaxial semiconductor layer.

12. The method of claim 9 wherein the step of forming the semiconductor layer comprises forming a polysilicon layer.

13. The method of claim 9 wherein the step of forming the at least one cavity comprises forming the at least one cavity to a depth of approximately 1 to 50 microns.

14. The method of claim 9 wherein the step of forming at least one cavity comprising forming more than one cavity, and wherein the step of removing a portion of the semiconductor material comprises forming a deformable member having corrugations therein.

15. A method of forming a sensor, comprising the steps of:

providing a semiconductor material having a first major surface and a second major surface;

forming at least one cavity extending from the first major surface into a portion of the semiconductor material;

forming a diaphragm layer over the first major surface of the semiconductor material and over the at least one cavity;

substantially planarizing the diaphragm layer so that a thick portion and a thin portion is formed in the diaphragm layer; and removing a portion of the semiconductor material extending from the second major surface to the diaphragm layer to provide at least a portion of the thick portion of the diaphragm layer formed over the at least one cavity.

* * * * *